United States Patent
Maji et al.

(10) Patent No.: US 9,671,937 B2
(45) Date of Patent: Jun. 6, 2017

(54) SYSTEM AND METHOD FOR DECLUTTERING AN IMAGE ON A COCKPIT DISPLAY SYSTEM

(71) Applicant: HONEYWELL INTERNATIONAL INC., Morristown, NJ (US)

(72) Inventors: Sanjib Kumar Maji, Bangalore (IN); Satyanarayan Kar, Bangalore (IN); Jitender Kumar Agarwal, Muzaffarnagar (IN); Sandeep Chakraborty, Kolkata (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 571 days.

(21) Appl. No.: 14/108,482

(22) Filed: Dec. 17, 2013

(65) Prior Publication Data
US 2015/0169191 A1  Jun. 18, 2015

(51) Int. Cl.
| H04L 12/58 | (2006.01) |
| G06F 3/0484 | (2013.01) |
| G06F 3/0482 | (2013.01) |
| G08G 5/00 | (2006.01) |

(52) U.S. Cl.
CPC ........ *G06F 3/04842* (2013.01); *G06F 3/0482* (2013.01); *G06F 3/04845* (2013.01); *G08G 5/0021* (2013.01)

(58) Field of Classification Search
CPC ........................... G08G 5/0021; G08G 5/0078
See application file for complete search history.

(56) References Cited

U.S. PATENT DOCUMENTS

| 7,765,061 B1 * | 7/2010 | Barber ................... G01C 23/00 701/436 |
| 8,203,465 B2 | 6/2012 | Shafaat et al. |
| 2002/0008640 A1 * | 1/2002 | Horvath .................. G01S 1/047 340/945 |
| 2007/0252749 A1 * | 11/2007 | Blaskovich ............... G01S 7/12 342/29 |
| 2010/0283636 A1 | 11/2010 | Clark et al. |

(Continued)

FOREIGN PATENT DOCUMENTS

| CN | 101510364 A | 3/2009 |
| EP | 2325825 A2 | 5/2011 |
| WO | 2012145061 A2 | 10/2012 |

OTHER PUBLICATIONS

EP extended search report for EP 14193963.7-1810 dated Nov. 2, 2015.

*Primary Examiner* — William Bashore
*Assistant Examiner* — Nathan Shrewsbury
(74) *Attorney, Agent, or Firm* — Lorenz & Kopf, LLP

(57) ABSTRACT

An avionics system and method is provided that de-clutters an image on a cockpit display system on a host aircraft, thus increasing a pilot's situational awareness. The avionics display system comprises a processor and a display system. The processor is coupled to the display system, a user input device, and a plurality of sources of information layers. When the de-clutter process is enabled, a filter parameter is applied to a selected information layer, and a graphic display of the filtered information layer is provided. The adjustable filter parameter can be applied to any of the information layers displayed on the cockpit display system.

7 Claims, 6 Drawing Sheets

(56) References Cited

U.S. PATENT DOCUMENTS

| | | | | |
|---|---|---|---|---|
| 2011/0125399 A1* | 5/2011 | Clark | ................... | G08G 5/0008 |
| | | | | 701/532 |
| 2012/0130624 A1* | 5/2012 | Clark | ..................... | G01C 23/00 |
| | | | | 701/117 |

* cited by examiner

SYSTEM AND METHOD FOR DECLUTTERING AN IMAGE ON A COCKPIT DISPLAY SYSTEM

TECHNICAL FIELD

Embodiments of the subject matter described herein relate generally to avionics display systems and, more particularly, to de-cluttering an image on a cockpit display system on a host aircraft, thus increasing a pilot's situational awareness.

BACKGROUND

Modern avionics display systems have been extensively engineered to visually convey a considerable amount of information. The displayed information is sourced from various databases, sensors, transponders and broadcasts. The information is organized in "information layers" (e.g., flight path information, Navigational Aids (NAVAID), airspace information, terrain information, weather information, traffic information, and the like). The various information layers are combined to provide a unified graphical display on the avionics display system.

Generally, traffic is an information layer displayed concurrently with various other information layers on avionics displays. The traffic information includes graphical traffic symbols depicting position and orientation of the traffic each having a data tag to provide enhanced traffic information. Enhanced traffic information includes Flight Identification, Closure Rate, Aircraft Type, and the like.

Avionics display systems generally utilize Cockpit Display of Traffic Information (CDTI) to monitor traffic information. CDTI obtains traffic information from multiple sources, such as Automatic Dependent Surveillance-Broadcast (ADS-B), Traffic Information Service Broadcast (TIS-B), and TCAS (Traffic Collision Avoidance System). Advances in aircraft surveillance have increased the amount of traffic information provided by these sources, for example, ADS-B provides traffic position and velocity data even from very distant traffic. This large amount of traffic information can create clutter on the display.

A pilot controls what is viewed on a navigation display (ND) by entering a range setting into a range selector. The range setting is applied to all information layers displayed on the navigation display. Contextually, a pilot may need to select a higher range setting to view the weather information, or a complete leg of a flight path. At these higher range settings, a large amount of undesired additional traffic is displayed, cluttering the display. The pilot may want to select a much lower range setting to view only traffic that is local to the host aircraft; however, while a lower range setting excludes the unwanted additional traffic information, it equally excludes information that the pilot may need that is sourced from other information layers (e.g., weather, terrain, flight path, NAVAIDS).

Thus, there is a need to enhance an avionics display by permitting a pilot to utilize the range selector on the navigation display and independently control a sub-range of information displayed from a selected information layer (e.g. the traffic layer), while not affecting the display of the other information layers. This enhanced avionics display should accept various parameters (e.g. sub-range, time, etc.). This dual range approach de-clutters the image on a cockpit display with respect to the selected information layer, thus increasing a pilot's situational awareness.

BRIEF SUMMARY

A method is provided suitable for de-cluttering an image on a cockpit display on a host aircraft. The image comprises at least two information layers. The method filters data from a selected information layer based on a filtering parameter. A composite filtered image is generated based on a filtered information layer and a non-filtered information layer. The composite filtered image is then displayed.

Another method for de-cluttering an image on a cockpit display system of a host aircraft is provided. The image comprises a plurality of layers. Symbology representing a plurality of selectable parameters is displayed on the cockpit display system. One of the selectable parameters is selected, and the traffic layer is filtered therewith. A composite filtered image that includes the filtered traffic layer and a plurality of non-filtered information layers is generated. The composite filtered image is then displayed.

In addition, a system is provided for de-cluttering an image on a cockpit display system of a host aircraft, wherein the image comprises a plurality of layers. A display system and a processor are included. A first source provides a first layer and a second source provides a second layer. A user input device provides filtering parameters. The processor is coupled to the display system, first source, second source and user input device. The processor is configured to receive a filtering parameter. Based on the filtering parameter, the processor filters the first layer. Based on the filtered first layer and the second layer, a composite filtered image is generated. Symbology that graphically represents the composite filtered image is generated on the cockpit display.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
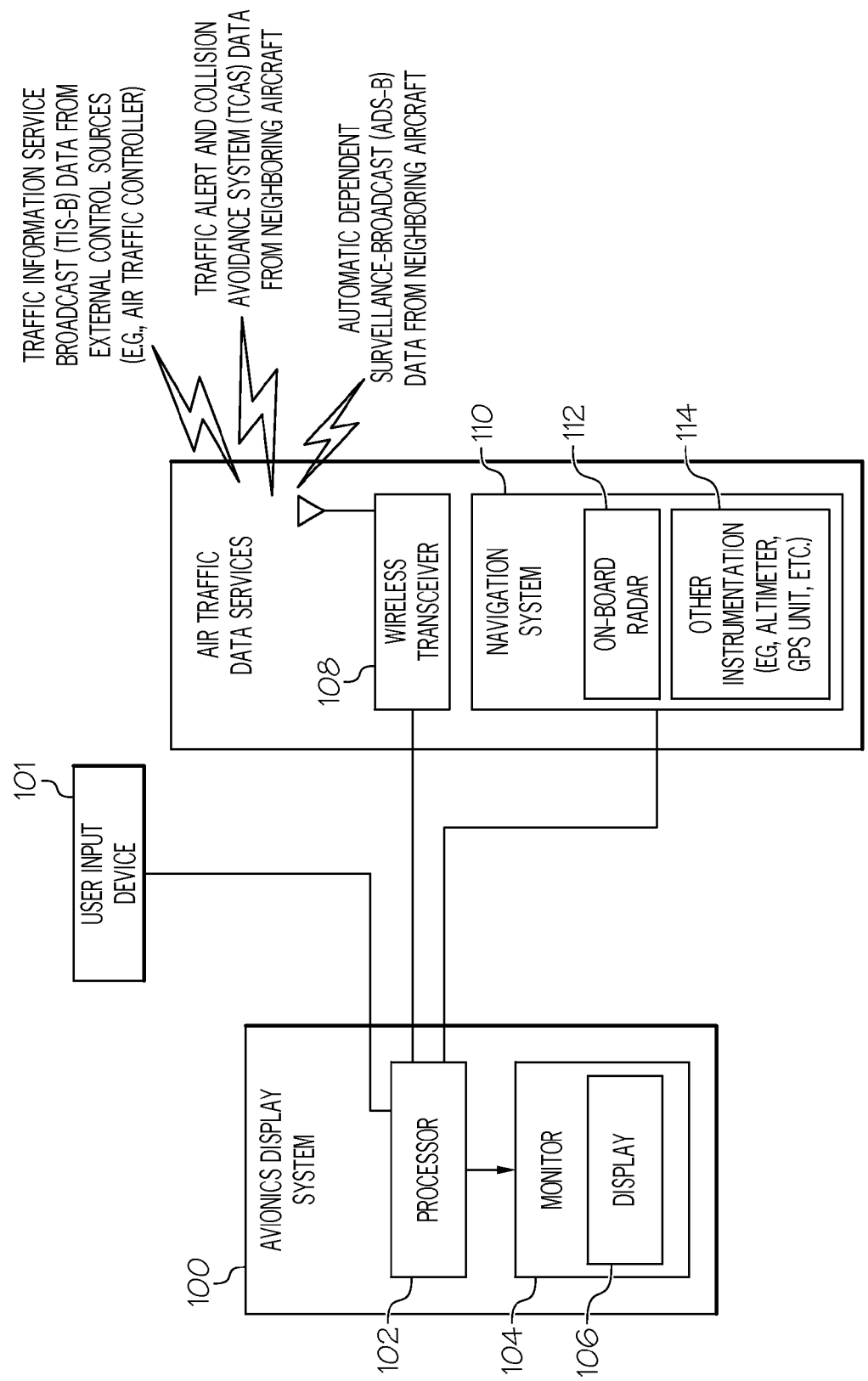
FIG. 1 is a block diagram of a generalized avionics display system in accordance with an exemplary embodiment.

FIG. 1 is functional block diagram illustrating an avionics display system 100 in accordance with an exemplary embodiment. Avionics display system 100 includes at least one processor 102, at least one monitor 104 and a user input device 101, each of which is operatively coupled to processor 102. During operation of avionics display system 100, processor 102 drives monitor 104 to produce a display 106 that visually provides a pilot and crew with a composite of navigation information pertaining to the host aircraft, weather, navigational aids (NAVAID), terrain, and aircraft traffic. Processor 102 may provide the display 106 with a composite image in a two dimensional format (e.g., as a moving map display), or a three dimensional format (e.g., as a perspective display), or in a hybrid format (e.g., in a picture-in-picture or split screen arrangement).

Processor 102 may comprise, or be associated with, any suitable number of individual microprocessors, flight control computers, navigational equipment, memories, power supplies, storage devices, interface cards, and other standard components known in the art. In this respect, the processor 102 may include or cooperate with any number of software programs (e.g., avionics display programs) or instructions designed to carry out the various methods, process tasks, calculations, and control/display functions described below. Processor 102 may be included within a Flight Management Computer of the type commonly deployed within a Flight Management System (FMS).

Image-generating devices suitable for use as monitor 104 include various analog (e.g., cathode ray tube) and digital (e.g., liquid crystal, active matrix, plasma, etc.) display devices. In certain embodiments, monitor 104 may assume the form of a Head-Down Display (HDD) or a Head-Up Display (HUD) included within an aircraft's Electronic Flight Instrument System (EFIS). Monitor 104 may be disposed at various locations throughout the cockpit. For example, monitor 104 may comprise a primary flight display (PFD) and reside at a central location within the pilot's primary field-of-view. Alternately, monitor 104 may comprise a secondary flight deck display, such as an Engine Instrument and Crew Advisory System (EICAS) display, mounted at a location for convenient observation by the aircraft crew but that generally resides outside of the pilot's primary field-of-view. In still further embodiments, monitor 104 may be worn by one or more members of the flight crew.

Processor 102 includes one or more inputs operatively coupled to one or more air traffic data sources. During operation of avionics display system 100, the air traffic data sources continually provide processor 102 with navigational data pertaining to neighboring aircraft. In the exemplary embodiment illustrated in FIG. 1, the air traffic data sources include a wireless transceiver 108 and a navigation system 110, which are operatively coupled to first and second inputs of processor 102, respectively. Navigation system 110 includes onboard radar 112 and other onboard instrumentation 114, such as a radio altimeter, a barometric altimeter, a global positioning system (GPS) unit, and the like. Navigation system 110 may be included within a FMS, and onboard radar 112 may be included within a Terrain Awareness and Warning System (TAWS), such as an Enhanced Ground Proximity Warning System (EGPWS).

With continued reference to FIG. 1, wireless transceiver 108 is considered an air traffic data source in that wireless transceiver 108 receives navigational data from external control sources and relays this data to processor 102. For example, wireless transceiver 108 may receive Traffic Information Services-Broadcast (TIS-B) data from external control sources, such as satellite and various ground-based facilities including Air Traffic Control Centers, Terminal Radar Approach Control Facilities, Flight Service Stations, control towers, and the like. In addition, wireless transceiver 108 may receive Automatic Dependent Surveillance-Broadcast (ADS-B) data and Traffic Collision Avoidance System (TCAS) data from neighboring aircraft. TIS-B data, ADS-B data, TCAS data and other such external source data are preferably formatted to include air traffic state vector information, which may be utilized to determine a neighboring aircraft's current position and velocity.

Figure 2:
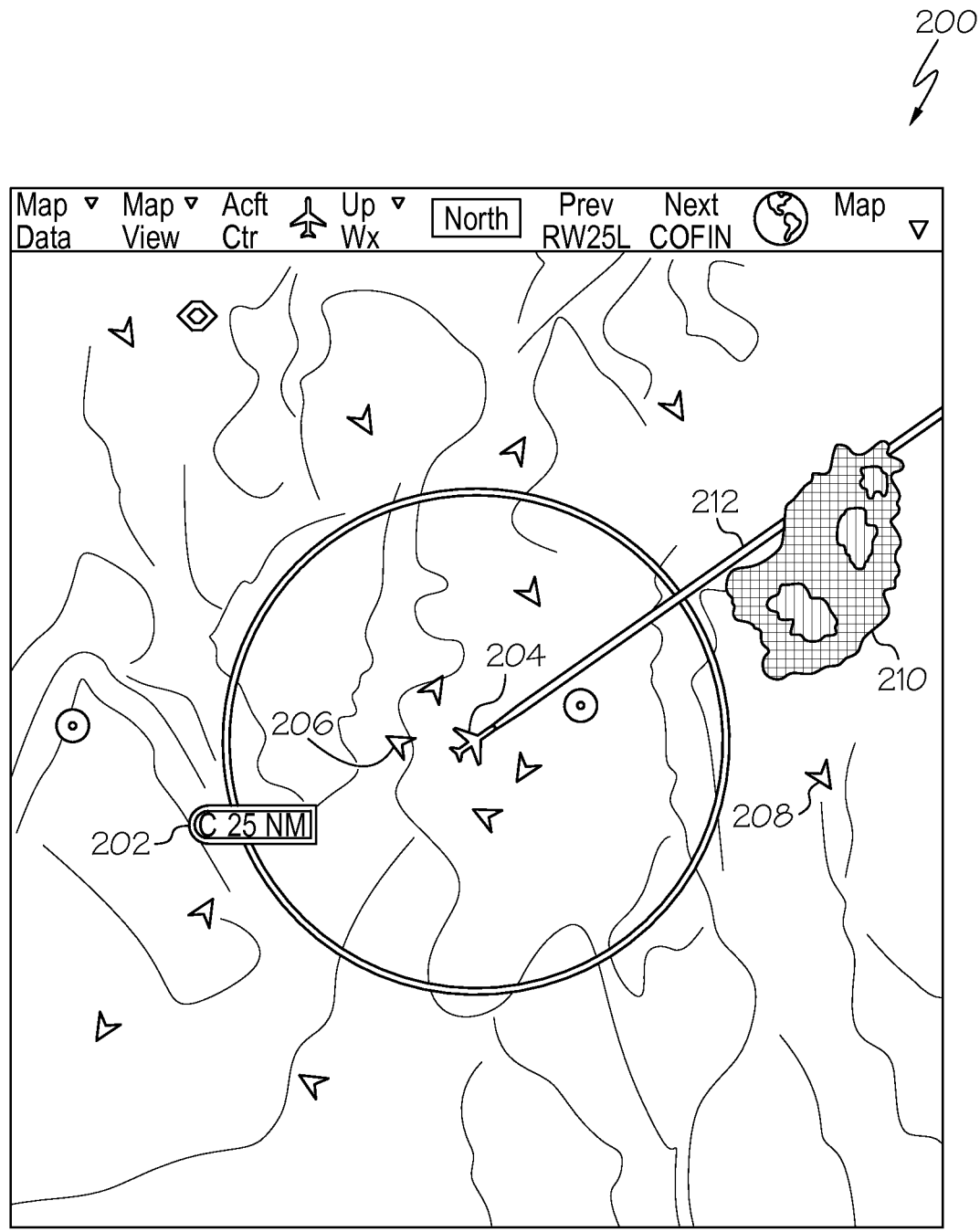
FIG. 2 illustrates a typical cockpit display graphic depicting all aircraft traffic within the range selected on the navigation display.

FIG. 2 illustrates a typical cockpit display graphic 200 depicting a composite image of information layers including all aircraft traffic within the range selected on the navigation display including host aircraft 204. The composite image displayed in FIG. 2 includes information layers such as weather pattern 210, and the flight path 212 of the host aircraft. A range ring 202 is shown. FIG. 2 additionally depicts aircraft traffic, including proximate aircraft 206, and more distant aircraft 208.

A de-clutter process is not enabled in FIG. 2; (i.e., either the Range Filter in Traffic submenu 306 described herein below is "OFF," or no de-clutter process is supported), therefore all aircraft traffic within the range selected on the navigation display is displayed on cockpit display graphic 200. The range ring 202 shown in FIG. 2 is set to twenty-five NM, providing the viewer with a circular area around the host aircraft based on distance.

Figure 3:
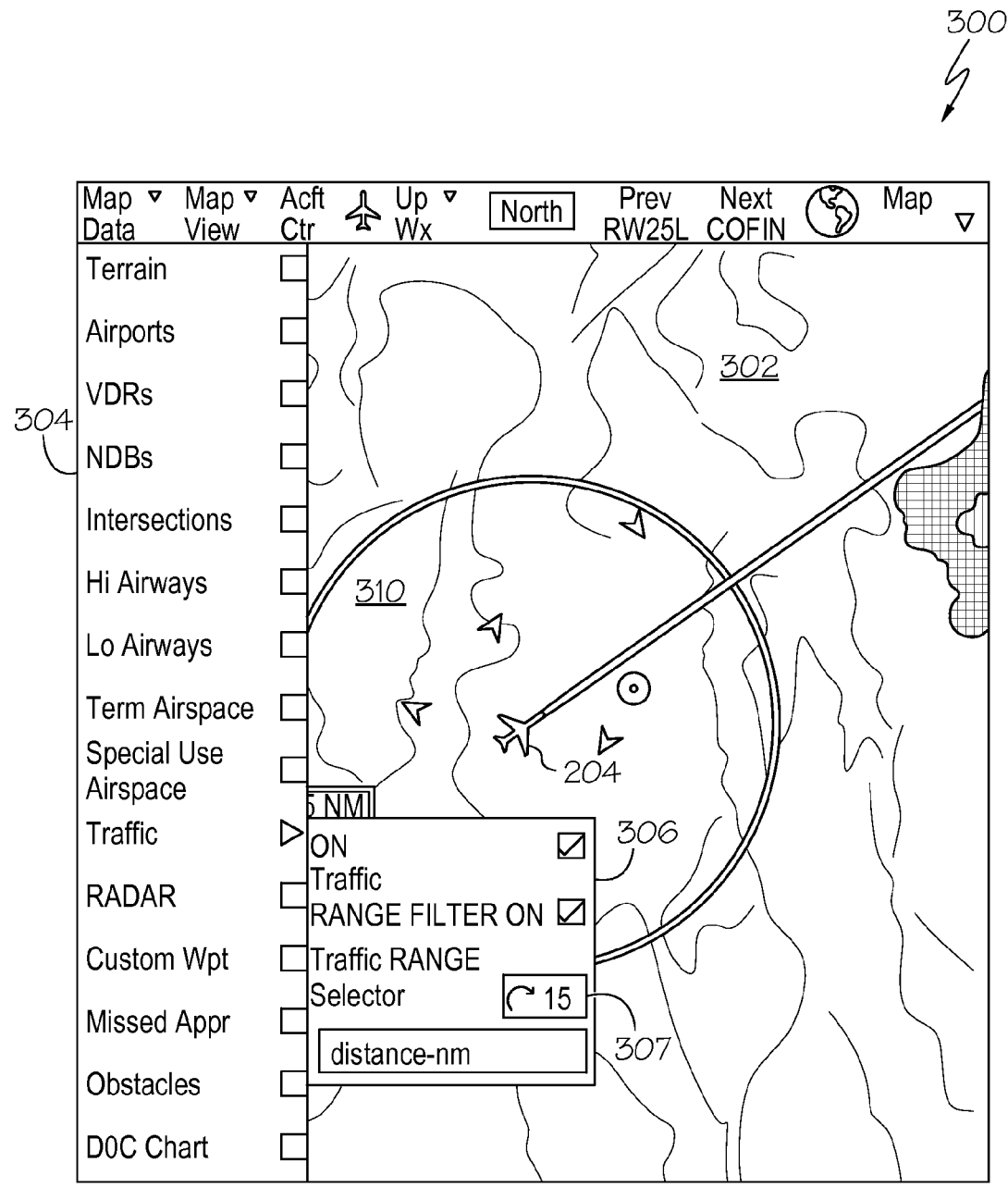
FIG. 3 is a cockpit display of a host aircraft illustrating menu selection with Traffic submenu selected in accordance with an exemplary embodiment.

FIG. 3 is a cockpit display of a host aircraft illustrating a menu selection in accordance with an exemplary embodiment. Specifically, FIG. 3 illustrates CDTI traffic displayed as a layer on a navigation display 300 that may be generated by processor 102 and displayed on monitor 104. Navigation display 300 depicts a composite image 302, menu of display selections 304, indicating a Traffic submenu 306 that is selected. Also shown on navigation display 300 is host aircraft 204.

In the Traffic submenu 306, Range Filter is depicted as "ON." The Traffic Range Selector 307 reflects the selection of distance or time with units of nautical miles (nm) or seconds (sec). The Traffic Range Selector 307 selects a sub-range, hereinafter referred to as the filter parameter. In the exemplary embodiment of FIG. 3, the filter parameter is set to a distance of 15 nautical miles (nm). The filter parameter is adjustable according to user input, as reflected in Traffic submenu 306. When 'Range Filter' is "ON", the de-clutter process is enabled, and the filter parameter is utilized to filter the selected information layer as described herein. Turning "Range Filter" "OFF" disables the filtering provided by the de-clutter process. The selection of time or range in the Traffic Range Selector 307 may be entered by the user. Alternatively, the Traffic Range Selector 307 may be preset to function solely in units of time or of distance, according to an original equipment manufacturer (OEM) preference.

Figure 4:
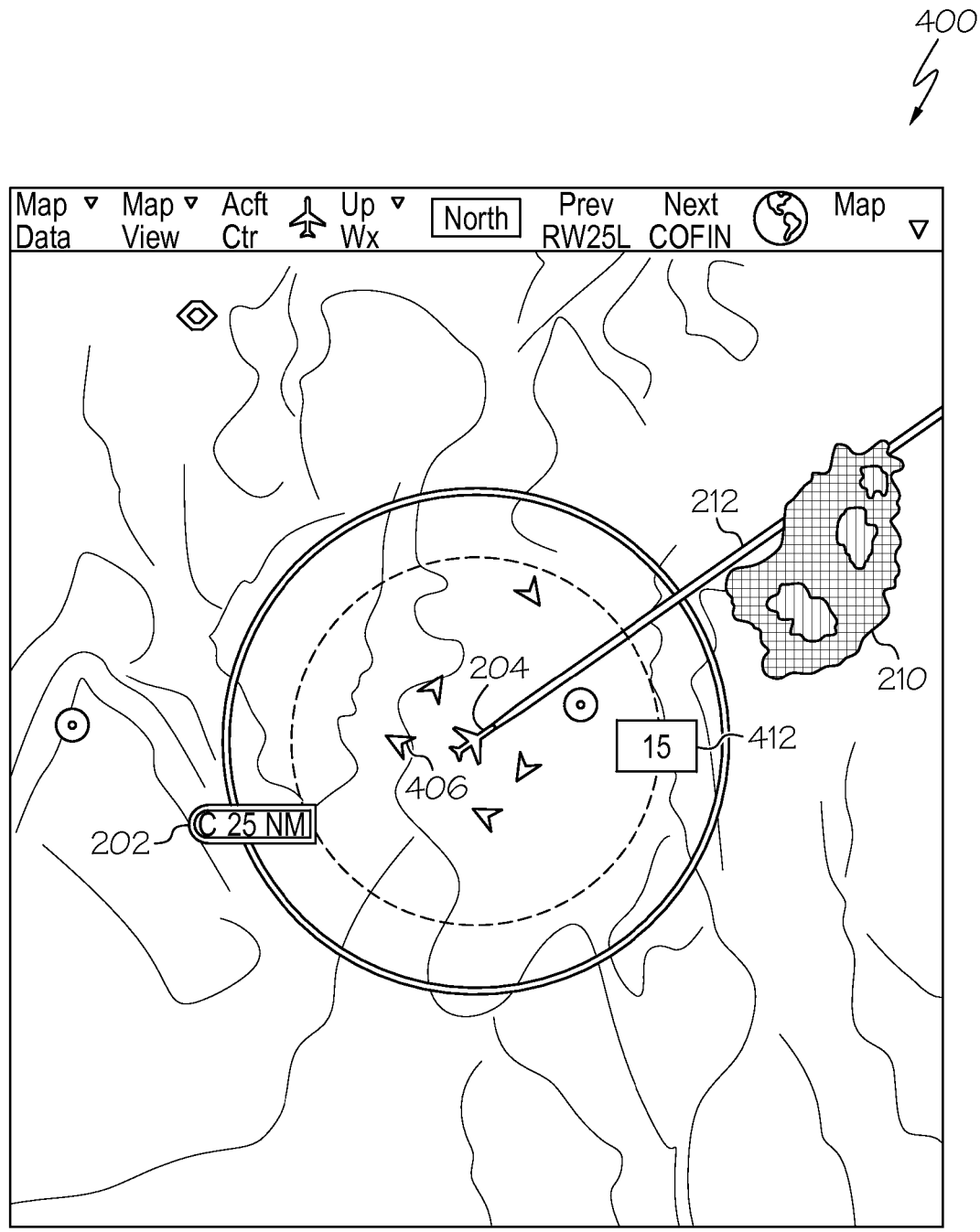
FIG. 4 illustrates a composite filtered image 400 displayed on the cockpit display in accordance with an exemplary embodiment.

FIG. 4 illustrates a composite filtered image displayed on cockpit display 400. It is similar to FIG. 2, with the Range Filter "ON" (de-clutter process enabled) as discussed herein. FIG. 4 depicts the range ring 202, host aircraft 204, weather pattern 210, and flight path 212 shown in FIG. 2. Display area 412 is a circular area representing the desired sub-range, extending outward from host aircraft 204 to a selected radius of fifteen nautical miles. The area generated by processor 102 (FIG. 1), in accordance with the filtering process, is referred to hereafter as the display area.

The composite filtered image on cockpit display 400 includes at least one non-filtered information layer and a filtered information layer. The filtered information layer only includes data from the selected information layer (in this case, proximate aircraft 406) that is within the display area 412 corresponding to the selection made in the Traffic submenu 306 in FIG. 3.

Figure 5:
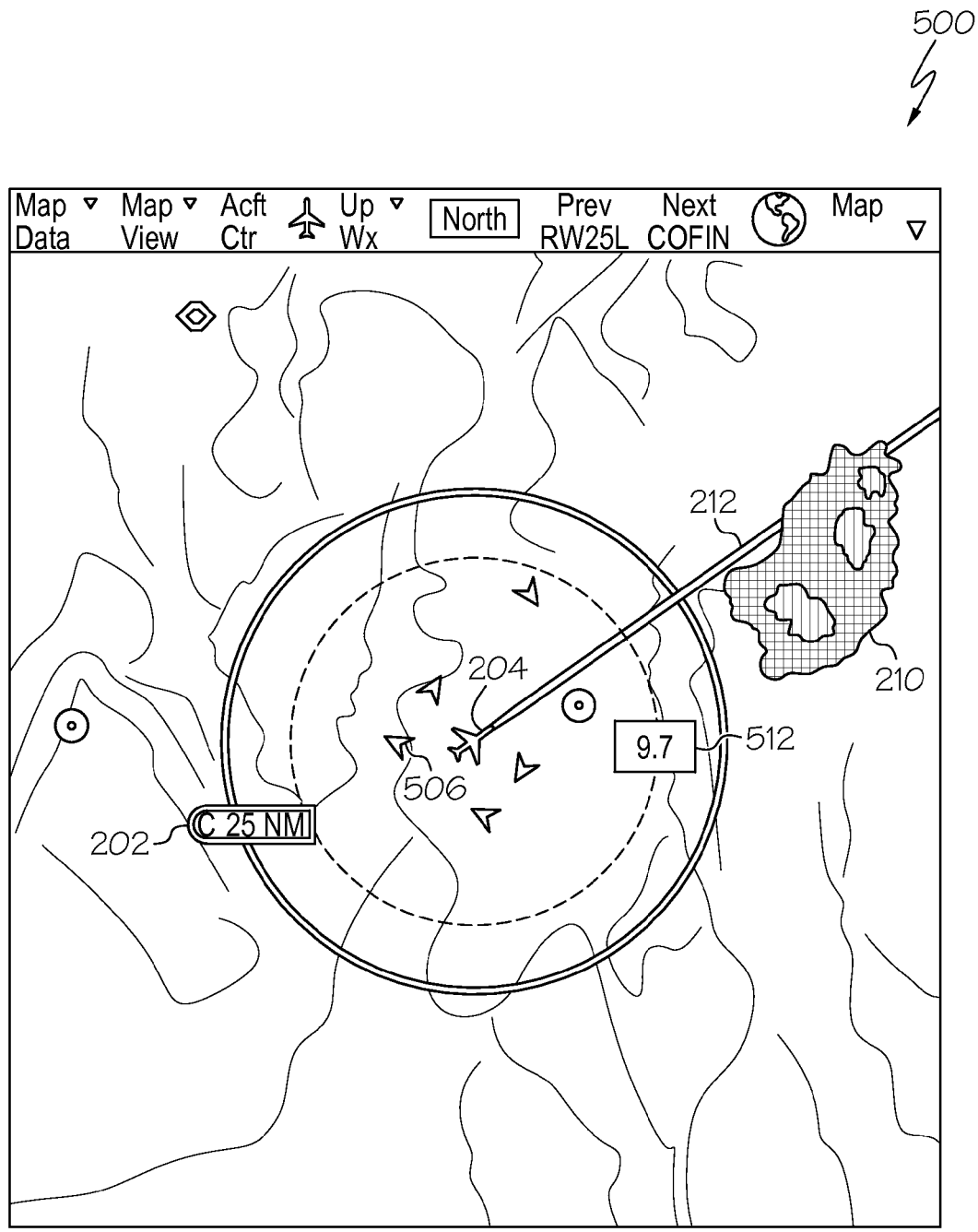
FIG. 5 illustrates a composite filtered image 500 displayed on the cockpit display in accordance with an exemplary embodiment.

FIG. 5 illustrates a composite filtered image displayed on a cockpit display 500 illustrating the above described de-cluttering process when the filtering is based on elapsed time from the host aircraft's current position. FIG. 5 depicts the range ring 202, host aircraft 204, weather pattern 210, and flight path 212 shown in FIG. 2. FIG. 5 also depicts a display area 512, representing the desired sub-range, extending outward from host aircraft 204.

As described herein, the radius of the display area 512 is determined by processor 102 (FIG. 1) based on the filter parameter that was entered on Traffic submenu 306 in FIG. 3. In the exemplary embodiment shown, the filtering parameter was entered as time; consequently, the radius of the display area, 9.7 nautical miles, is based on current and expected aircraft operating conditions along the flight path. As described herein, the processor 102 generates filtered information layer data that only includes data from the selected information layer that is within the display area (in this case, proximate aircraft 506).

Figure 6:
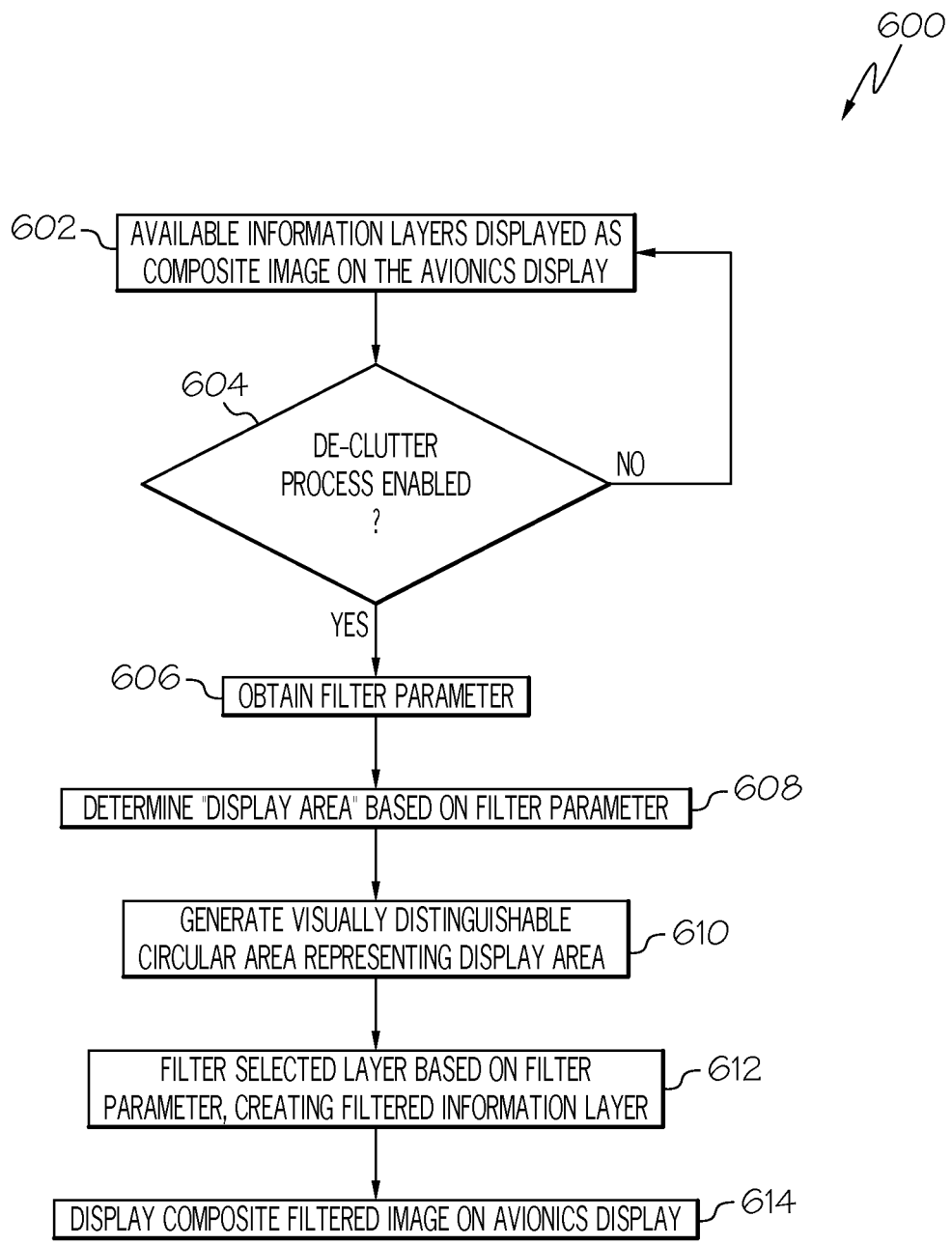
FIG. 6 is a flow chart describing a process 600 for reducing clutter on a cockpit display system of a host aircraft to increase a pilot's situational awareness.

FIG. 6 is a flow chart describing a process 600 for de-cluttering an image on a cockpit display system of a host aircraft based on a selected parameter such as time or distance. Initially, a plurality of layers of information including, for example, a weather layer, a terrain layer, a traffic layer, etc., is displayed as separate overlapping layers to produce a composite image on the avionics display (STEP 602). A user (e.g. the pilot) enables the de-clutter process (STEP 604) by selecting, on the menu, Range Filter "ON" as described herein above. The user can enter the desired filter parameter (STEP 606). Next, the processor determines the display area based on the filter parameter (STEP 608). The display area is substantially circular, with the host aircraft at its center, and having a radius equal to the, for example, (1) the selected distance or (2) the distance the aircraft would reach in a selected time based on prevailing and anticipated flight conditions. The processor generates a visually distinguishable (e.g. a different color, shade, etc.) circular area representing the display area (STEP 610) with the host aircraft at its center and extending therefrom to a radius determined by the selected filter parameter (distance in this case). Selected information layer is filtered based on the filter parameter to create a filtered information layer (STEP 612). After filtering, a filtered information layer contains only selected layer data (traffic in this case) from within the display area.

A composite filtered image is displayed (STEP 614) that includes (1) the filtered selected layer (traffic, in this case) in place of the full dataset for the selected layer, and (2) various other informational layers (e.g., terrain, weather, NAVAID, flight path, etc.).

Thus, there has been provided an avionics display system and method that permits a pilot to select an information layer on the display and independently control a sub-range represented as a display area. The display area is based on a desired filter parameter (e.g. distance, time, etc.) associated with the selected information layer and does not affect the display of other information layers. In this manner, the system and method de-clutter the image on the cockpit display with respect to the selected information layer thus increasing a pilot's situational awareness.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for de-cluttering an image on a cockpit display aboard a host aircraft wherein the image comprises at least two information layers, the method comprising:
   receiving a user selected information layer from among presented information layer selection options comprising, (1) a traffic layer, (2) a weather layer, (3) a terrain layer, (4) a navigational aid (NAVAID) layer, and (5) a flight path layer;
   receiving a user selected filter parameter, wherein the filter parameter defines a sub-range of a range ring area on the image;
   filtering the selected information layer based on the filter parameter to create a filtered information layer that only includes data from the selected information layer that is within the sub-range;
   generating a composite filtered image comprised of the filtered information layer and a non-filtered information layer; and
   displaying the composite filtered image.

2. The method of claim 1, further comprising displaying, on the image, a visually distinguishable circular area representing the sub-range.

3. The method of claim 2, wherein the filter parameter is a radius from the host aircraft.

4. The method of claim 2, wherein the filter parameter is a selected time and the sub-range represents a distance the host aircraft will travel during the selected time.

5. The method of claim 1, further comprising receiving at least one of: (1) Automatic Dependent Surveillance-Broadcast (ADS-B) data; (2) Traffic Information Service Broadcast (TIS-B) data; and (3) TCAS (Traffic Collision Avoidance System data).

6. The method of claim 3, further comprising displaying symbology on the display graphically representative of a parameter selector.

7. A method for de-cluttering an image on a cockpit display of a host aircraft, wherein the image comprises a plurality of information layers, the method comprising:
   displaying a menu comprising symbology representing a plurality of selectable filter parameters on the cockpit display;
   receiving, by a cockpit display system, a user selected filter parameter defining a sub-range of the image, the sub-range representing a distance the host aircraft will travel during the filter parameter;
   filtering a traffic layer based on the selected parameter to create a filtered traffic layer that only includes data from the traffic layer that is within the sub-range;
   generating a composite filtered image that includes the filtered traffic layer and at least one non-filtered information layer; and
   displaying the composite filtered image; and, wherein the filter parameter is a selected time displaying, on the composite filtered image, a visually distinguishable circular area representing the sub-range.

* * * * *